(12) United States Patent
Rhea et al.

(10) Patent No.: US 9,090,272 B2
(45) Date of Patent: Jul. 28, 2015

(54) SYSTEM AND METHOD FOR CONTROLLING BRAKING OF A TRAIN

(71) Applicant: ANSALDO STS USA, INC., Pittsburgh, PA (US)

(72) Inventors: William Stover Rhea, Lower Burrell, PA (US); Chinnarao Mokkapati, Export, PA (US); Robert D. Pascoe, Pittsburgh, PA (US); Brian Michael Nypaver, Pittsburgh, PA (US)

(73) Assignee: Ansaldo STS USA, Inc., Pittsburgh, PA (US)

( * ) Notice: Subject to any disclaimer, the term of this patent is extended or adjusted under 35 U.S.C. 154(b) by 0 days.

(21) Appl. No.: 14/177,588

(22) Filed: Feb. 11, 2014

(65) Prior Publication Data

US 2014/0180573 A1    Jun. 26, 2014

Related U.S. Application Data

(62) Division of application No. 12/703,959, filed on Feb. 11, 2010, now abandoned.

(60) Provisional application No. 61/152,098, filed on Feb. 12, 2009, provisional application No. 61/152,083, filed on Feb. 12, 2009, provisional application No. 61/152,040, filed on Feb. 12, 2009, provisional application No. 61/152,101, filed on Feb. 12, 2009.

(51) Int. Cl.
*G05D 1/00* (2006.01)
*B61L 27/04* (2006.01)
(Continued)

(52) U.S. Cl.
CPC .............. *B61L 27/04* (2013.01); *B60T 13/665* (2013.01); *B60T 17/228* (2013.01); *B61L 3/008* (2013.01)

(58) Field of Classification Search
CPC ............. B61L 3/008; B61L 3/02; B61L 3/16; B61L 3/00; B61L 3/006; B61L 27/04; B60T 17/228
USPC ............ 701/20, 70; 246/182 R, 182 A, 182 B
See application file for complete search history.

(56) References Cited

U.S. PATENT DOCUMENTS 5,340,062 A * 8/1994 Heggestad ........................ 246/5
5,440,489 A * 8/1995 Newman .......................... 701/20
(Continued)

OTHER PUBLICATIONS

Presciani et al. "Development of a braking model for a speed supervision system," World Congress on Railway Research, Nov. 2001, pp. 1-18.

(Continued)

*Primary Examiner* — James English
(74) *Attorney, Agent, or Firm* — Eckert Seamans Cherin & Mellott, LLC; Philip E. Levy

(57) ABSTRACT

A method of controlling braking of a train that includes obtaining in an on-board computer of the train a brake propagation delay time ($T_d$), a brake build-up time (T) and a maximum brake rate ($\alpha_{max}$) for the train, and controlling braking of the train in the on-board computer by generating one or more braking signals for the train using $T_d$, T and $\alpha_{max}$. Also, a methods of determining for a train a profile velocity to a target position of a selected target, selecting a most restrictive target from among a plurality of targets for a train, and determining a plurality of braking parameters for a train having a train consist, wherein the parameters include a brake propagation delay time ($T_d$), a brake build-up time (T) and a maximum brake rate ($\alpha_{max}$).

6 Claims, 7 Drawing Sheets

(51) Int. Cl.
*B61L 3/00* (2006.01)
*B60T 13/66* (2006.01)
*B60T 17/22* (2006.01)

(56) References Cited

U.S. PATENT DOCUMENTS

| | | | |
|---|---|---|---|
| 5,452,870 | A | 9/1995 | Heggestad |
| 5,744,707 | A | 4/1998 | Kull |
| 5,927,822 | A | 7/1999 | Hart |
| 6,648,424 | B2 | 11/2003 | Vaughn |
| 7,395,141 | B1 | 7/2008 | Seck et al. |
| 2006/0076826 | A1 | 4/2006 | Kane |
| 2008/0033605 | A1* | 2/2008 | Daum et al. ............... 701/19 |
| 2008/0195269 | A1 | 8/2008 | Lacy et al. |
| 2008/0306641 | A1 | 12/2008 | Matusiak et al. |
| 2011/0320115 | A1* | 12/2011 | Oh et al. ............... 701/200 |
| 2012/0072088 | A1 | 3/2012 | Cutright |

OTHER PUBLICATIONS

Malvezzi et al., "Probabilistic analysis of braking performance in railways," Proceedings of the Institution of Mechanical Engineers, Part F., vol. 217, Iss. 3, May 2003, pp. 149-165.

* cited by examiner

US 9,090,272 B2

SYSTEM AND METHOD FOR CONTROLLING BRAKING OF A TRAIN

CROSS-REFERENCE TO RELATED APPLICATIONS

This application is a divisional of co-pending U.S. application Ser. No. 12/703,959, entitled "System and Method for Controlling Braking of a Train," which was filed on Feb. 11, 2010 and which claims priority under 35 U.S.C. §119(e) from U.S. Provisional Application No. 61/152,098, entitled "Method to Determine Time to Penalty Full Service Brake Application to Assure Safe Braking Occurs", filed on Feb. 12, 2009, U.S. Provisional Application No. 61/152,083, entitled "Method of Braking a Train Utilizing Speed Profile and Time to Penalty Processes", filed on Feb. 12, 2009, U.S. Provisional Application No. 61/152,040, entitled "Method for Braking a Train for a Given Train Configuration to reduce Train Speed to a Target Speed Over a Specific Distance and Grade Scenario to a Target Position", filed on Feb. 12, 2009, and U.S. Provisional Application No. 61/152,101, entitled "Method to Determine the Maximum Velocity that a Given Train Configuration Can be Travelling at Any Instant in Time to Assure a Speed Reduction Resulting from a Full Service Brake Application that Will Result in a Target Speed Over a Specific Distance and Grade Scenario to a Target Position", filed on Feb. 12, 2009, the disclosures of which are incorporated herein by reference.

GOVERNMENT CONTRACT

Inventors' Assignee has a contract with the Alaska Railroad Corporation, an Alaskan corporation (ARRC Contract No. 25329). Funding for this contract is provided, in part, by the Federal Railroad Administration, a United States government agency. The United States government may have certain rights in the invention described herein.

BACKGROUND OF THE INVENTION

1. Field of the Invention

The present invention relates to the automatic control of trains, and in particular to positive train control systems and methodologies that provide enhanced safety by controlling the braking of a train including generating braking signals or requests that are provided to a train engineer and/or that automatically cause a brake application to occur.

2. Description of the Related Art

Positive train control (PTC) refers to various technologies that are used to monitor and control the movements of trains, such as passenger and freight trains, to provide increased safety. In PTC systems, the train receives information about its location, including maximum speed limits, and where it is allowed to safely travel. Equipment on-board the train then enforces these limits to prevent unsafe movement. In particular, PTC systems employ sophisticated braking algorithms designed to review speeds, track conditions, and vehicle locations and automatically slow a train or bring a train to a safe stop (by alerting the crew and/or automatically causing an emergency stop of the train) if the train encounters a condition (such as the engineer not paying attention to a signal or a switch not being fully engaged) that could lead to an accident. A typical PTC system consists of equipment provided on the train, equipment provided in a centralized control center, equipment provided on the rail wayside, and a wireless communication system that allows for wireless communications between the elements just identified.

While many known PTC systems and technologies have proven to be effective in certain situations, there is room for improvement in the field of positive train control, and in particular braking algorithms and related control functions.

SUMMARY OF THE INVENTION

In one embodiment, the invention provides a method of controlling braking of a train that includes obtaining in an on-board computer of the train a brake propagation delay time ($T_d$), a brake build-up time (T) and a maximum brake rate ($\alpha_{max}$) for the train, and controlling braking of the train in the on-board computer by generating one or more braking profiles for the train using $T_d$, T and $\alpha_{max}$, which may then be displayed to the driver of the train for controlling the train.

In another embodiment, the invention provides a train-borne component of a positive train central system that includes an on-board computer for a train, wherein the on-board computer is programmed to control braking of the train by obtaining a brake propagation delay time ($T_d$), a brake build-up time (T) and a maximum brake rate ($\alpha_{max}$) for the train, and controlling braking of the train by generating one or more braking profiles for the train using $T_d$, T and $\alpha_{max}$, which may then be displayed to the driver of the train for controlling the train.

In still another embodiment, the invention provides a method of determining for a train a profile velocity to a target position of a selected target having a target speed, wherein the train has a current position located a first distance from the target position. The method includes determining in an on-board computer of the train a second distance, the second distance being a distance from the current position that would be required by the train to reach the target speed at the instant brake build-up in the train is complete, and determining in the on-board computer whether the first distance is greater than or equal to the second distance. If the first distance is greater than or equal to the second distance, the method includes determining in the on-board computer the profile velocity using one or more first equations, wherein the one or more first equations assume that steady state braking by the train is needed to achieve the target speed from the current position. If the first distance is not greater than or equal to the second distance, the method includes (i) determining in the on-board computer a third distance, the third distance being a distance from the current position that would be required by the train to reach the target speed at the instant brake propagation delay is complete, (ii) determining in the on-board computer whether the third distance is greater than or equal to the first distance, and (iii) (a) if the third distance is greater than or equal to the first distance, determining in the on-board computer the profile velocity using one or more second equations, wherein the one or more second equations assume that steady state braking by the train is not needed to achieve the target speed from the current position but that transient braking is needed to achieve the target speed from the current position, and (b) if the third distance is not greater than or equal to the first distance, determining in the on-board computer the profile velocity using one or more third equations, wherein the one or more third equations assume that neither steady state braking nor transient braking by the train is needed to achieve the target speed from the current position.

In yet another embodiment, the invention provides a train-borne component of a positive train control system that includes an on-board computer for a train, wherein the on-board computer is programmed to determine for the train a profile velocity to a target position of a selected target having a target speed when the train has a current position located a first distance from the target position using the method just described.

In still another embodiment, the invention provides a method of selecting a most restrictive target from among a plurality of targets for a train having an on-board computer, wherein the train is located at a current position. The method includes performing each of the following steps in the on-board computer: (a) initially including all of the plurality of targets in a group of targets to be evaluated, and (b) performing a series of evaluations on selected pairs of the targets in the group until only one of the targets remains in the group, wherein in each of the evaluations a first one of the targets remaining in the group and a second one of the targets remaining in the group are evaluated together to determine which one of them is a more restrictive target based on a profile velocity to the first one of the targets and the target speed associated with the second one of the targets, wherein in each of the evaluations the first one of the targets is the target remaining in the group that is furthest from the current position of the train and the second one of the targets is the target remaining in the group that is second furthest from the current position of the train, and wherein following each of the evaluations the one of the first one of the targets and the second one of the targets not determined to be more restrictive is removed from the group, and wherein when all of the evaluations are completed the one of the targets that remains in the group is identified as the most restrictive target.

In yet another embodiment, the invention provides a train-borne component of a positive train control system that includes an on-board computer for a train, wherein the on-board computer is programmed to select a most restrictive target from among a plurality of targets when the train is located at a current position using the method just described.

In another embodiment, a method of selecting a most restrictive target from among a plurality of targets for a train having an on-board computer is provided, wherein each of the targets has an associated target speed and wherein the train is located at a current position. The method includes performing the following steps in the on-board computer: (a) including all of the plurality targets in a group of targets to be evaluated, (b) indentifying as a first target the one of the targets that is located furthest from the current position and as a second target the one of the targets that is located second furthest from the current position, and eliminating the first target and the second target from the group, (c) determining a profile velocity to the first target; and (d) (1) if the profile velocity to the first target is greater than the target speed associated with the second target or if a time to penalty brake application for the second target is less than a predetermined amount: (i) determining whether any targets remain in the group, and (ii) if no targets remain in the group, setting the most restrictive target to be the second target and ending the method, and (iii) if targets do remain in the group, identifying as the first target the second target, identifying as the second target the target remaining in the group that is furthest from the current position, removing from the group the target remaining in the group that is furthest from the current position, determining the profile velocity to the first target, and repeating step (d) one or more times until the method ends, (2) if the profile velocity to the first target is not greater than the target speed associated with the first target and if the time to penalty brake application for the second target is not less than the predetermined amount: (i) determining whether any targets remain in the group, and (ii) if no targets remain in the group, setting the most restrictive target to be the first target and ending the method, and (iii) if targets do remain in the group, identifying as the second target the target remaining in the group that is furthest from the current position, removing from the group the target remaining in the group that is furthest from the current position, and repeating step (d) one or more times until the method ends.

In still another embodiment, the invention provides a train-borne component of a positive train control system that includes an on-board computer for a train, wherein the on-board computer is programmed to select a most restrictive target from among a plurality of targets when the train is located at a current position by performing the method just described.

In another embodiment, the invention provides a method of determining a plurality of braking parameters for a train having a train consist, wherein the method includes obtaining train consist parameters for the train consist, wherein the consist parameters include a length (L) of the train consist, a ratio (w) of a weight (W) of the train consist to a total number (V) of brake valves in the train consist excluding any brake valves on any locomotives in the train consist, a total number (N) of cars in the train consist excluding the any locomotives, and a number ($n_i$) of each type of car in the train consist excluding the any locomotives, determining a brake propagation delay time ($T_d$) for the train based on L, N and $n_i$, determining a brake build-up time (T) for the train based on L, N and $n_i$, and determining a maximum brake rate ($\alpha_{max}$) for the train based on L, N, $n_i$ and w.

In another embodiment, the invention provides a train-borne component of a positive train control system that includes an on-board computer for a train having a train consist, wherein the on-board computer is programmed to determine a plurality of braking parameters for the train using the method just described.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE EXEMPLARY EMBODIMENTS

Figure 1:
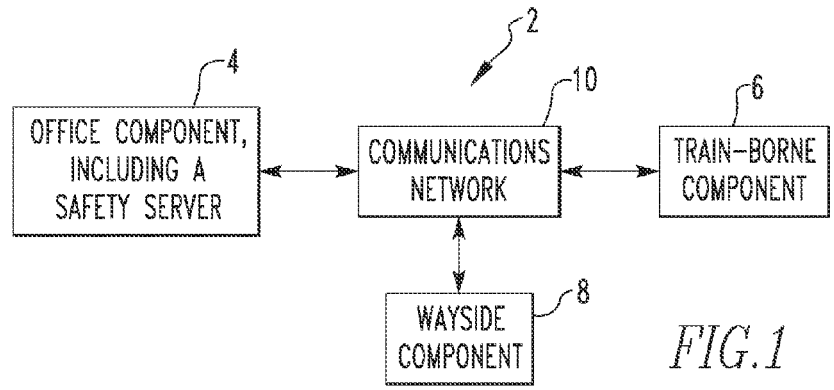
FIG. 1 is a block diagram of a high-level architecture of a railroad Positive Train Control (PTC) system according to one particular embodiment which implements the principles of the present invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

FIG. 1 is a block diagram of a high-level architecture of a railroad Positive Train Control (PTC) system 2 according to one particular embodiment which implements the principles of the present invention as described in greater detail herein. As seen in FIG. 1, the PTC system 2 includes an office component 4, including a safety server, a train-borne component 6, and a wayside component 8. The three components of the PTC System 2 just described exchange information with each other using a secure communications network 10, which is typically a wireless data radio network. The office component 4 of the PTC system 2 provides a central command and control facility for management of the train traffic and work crews on the railroad. As noted above, the office component 4 also contains a safety server that adds the required safety level to the command and control functions of the PTC system 2 by knowing where all of the trains are located in the railroad system associated with the PTC system 2. As described in greater detail elsewhere herein, the train-borne component 6 includes an on-board computer 12 (FIG. 2) that performs all train-borne control functions of the PTC system 2, including safe speed control. The train-borne component 6 also includes a number of human-machine interfaces in the form of locomotive display units 14 (FIG. 2) for the train crew to interact with the PTC system 2. The wayside component 8 provides vital information to the office component 4 and the train-borne component 6 regarding the status of wayside devices such as switches, signals, track circuits (used for rail integrity monitoring), highway-rail grade crossing warning devices, and hazard detectors, etc., in order to maintain safe train movement on the railroad.

Figure 2:
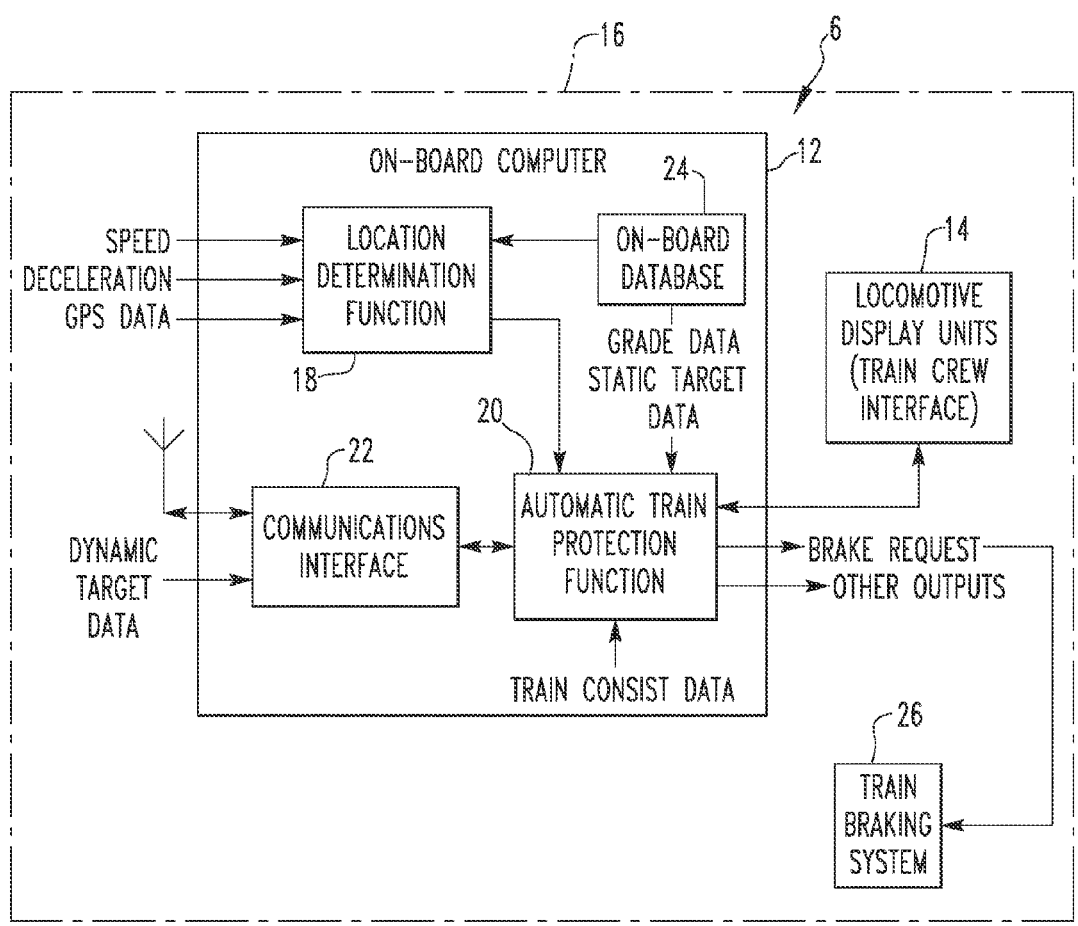
FIG. 2 is a block diagram of certain components of the train-borne component of the PTC system of FIG. 1 according to an exemplary embodiment of the invention.

FIG. 2 is a block diagram of certain components of the train-borne component 6 provided on a train 16 according to an exemplary embodiment of the invention. As noted above, the train-borne component 6 includes an on-board computer 12 that performs all train-borne control functions of the PTC system 2. In the exemplary embodiment, the on-board computer 12 consists of one or more processing units that are programmed to perform all the functions necessary for safe train control. In addition, the train braking function of the present invention that is described in greater detail elsewhere herein is implemented in the on-board computer 12. More specifically, as seen in FIG. 2, the on-board computer 12 includes a Location Determination (LD) function 18, an Automatic Train Protection (ATP) function 20, a communications interface 22, and an on-board database 24. The communications interface 22 allows for communications with the office component 4 and the wayside component 8.

The on-board database 24 is preloaded with and stores certain information needed by the train-borne component 6 including, without limitation, an ATP target table which includes information relating to a number of targets in the railroad system. In the exemplary embodiment, the ATP target table includes the following data for each target: (i) the location of the target (from which a current distance to the target may be determined), (ii) the target speed limit ($V_T$), and (iii) the distance between the target and the previous target.

The ATP target table that is stored in the on-board database 24 may be for the entire railroad system, or for a portion of the railroad system that is relevant to the train 16 for its current journey. Also, the ATP target table that is stored in the on-board database 24 may be updated periodically by the office component 4 through the communications interface 22.

In operation, the locations of the leading end and trailing end of the train 16 are determined by the LD function 18 and the ATP function 20 using inputs such as train speed, GPS coordinates, train deceleration (under slip/slide conditions) and the track segment information stored in the on-board database 24. According to an aspect of the present invention, the ATP function 20 continuously receives other safety-critical information from the office component 4 and the wayside component 8 via the communications interface 22, looks three miles ahead of the current location of the train 16 for any speed restrictions to be met (based on information from the ATP target table stored in the on-board database 24), and determines the safe speed limit at its current location. It also determines the time to a penalty brake application in the event the train exceeds the safe speed limit. As used herein, the term "time to penalty" shall mean the time (in seconds) that a train can travel at its current speed before a penalty brake request will occur in response to a penalty curve violation, and the term "penalty brake request" shall mean a full service brake request in response to a penalty condition. The ATP function 20 computes these safety-critical outputs using the braking function methodology of the present invention, an exemplary embodiment of which is described in greater detail below in connection with FIGS. 3A and 3B. The ATP function 20 also conveys certain information, such as distance to target and time to penalty, to the train crew via the locomotive display units 14 forming a part of the train-borne component 6. If the speed of the train 16 exceeds the safe limit at any point, the ATP function 20 issues a penalty brake request to reduce the speed of the train 16 to a safe speed (e.g., a complete stop). More specifically, in the case of a penalty brake request, the ATP function 20 sends a brake request to the train braking system 26 of the train 16 which causes the brakes of the train 16 to be applied. The ATP function 20 simply performs overspeed protection at the current civil speed limit when there are no other speed restrictions within three miles of the current location of the train 16.

Figure 3A:
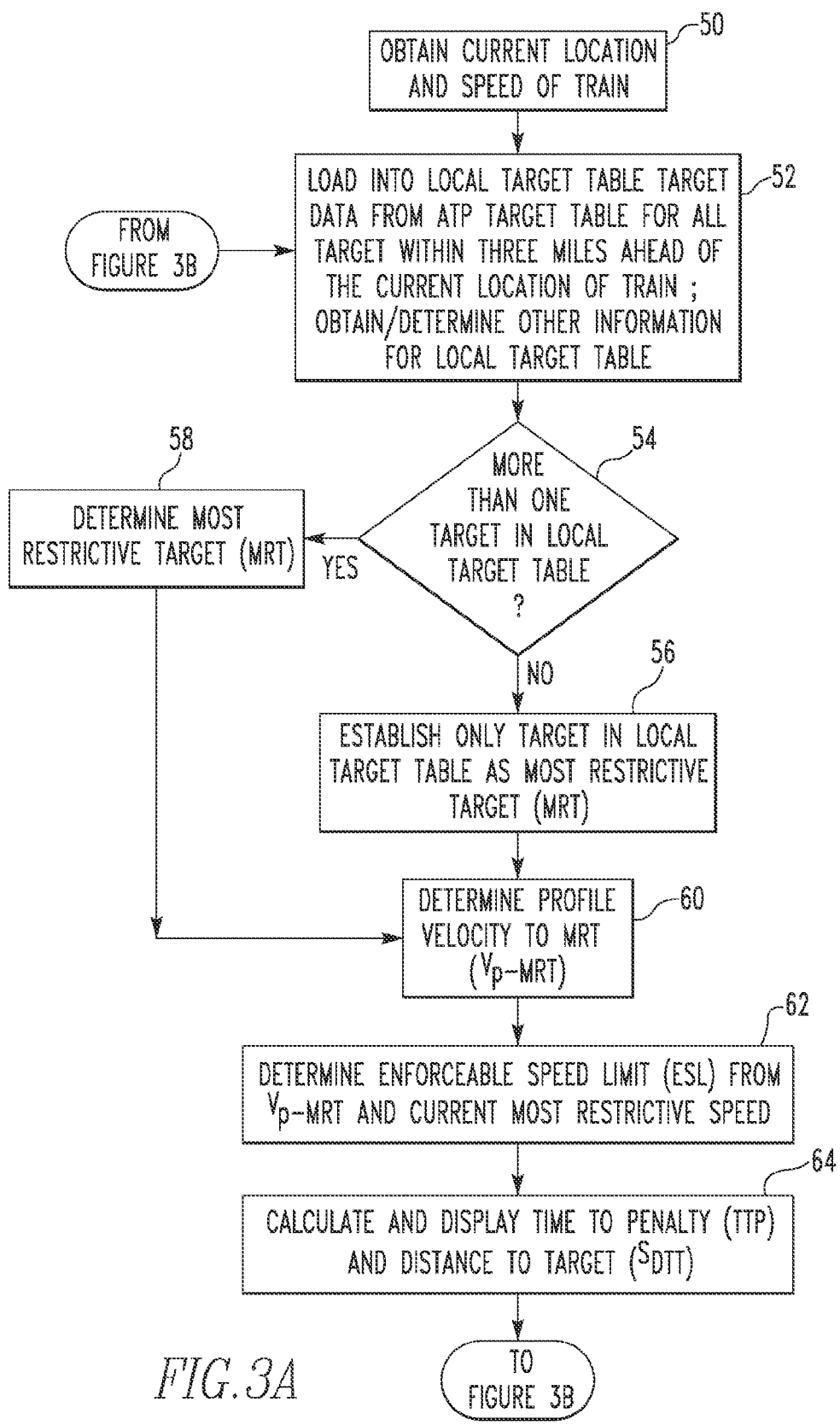
FIGS. 3A and 3B are a flowchart of one particular, exemplary embodiment of the braking function methodology of the present invention.
Figure 3B:
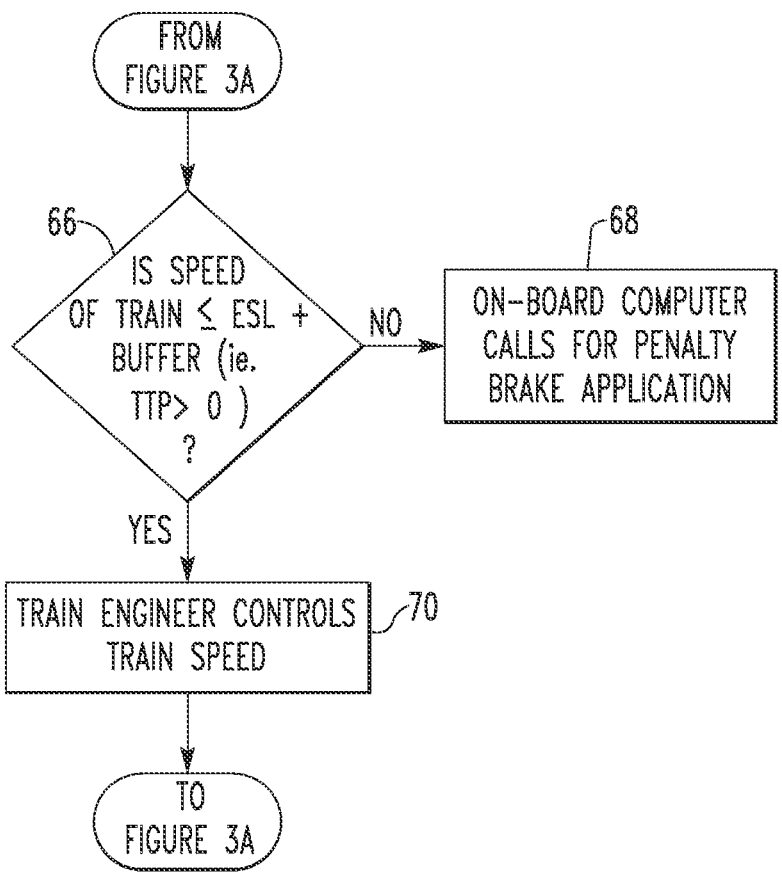

FIGS. 3A and 3B are a flowchart of one particular, exemplary embodiment of the braking function methodology of the present invention. Preferably, the braking function methodology of FIGS. 3A and 3B is implemented as a number of software routines in the on-board computer 12 of the train-borne component 6. As described in detail below, the braking function methodology of the present invention is able to provide safe braking functionality to the train 16 as it moves along its route on an area of mapped track. Prior to execution of the braking function methodology, the train 16 must be initialized, which, in the exemplary embodiment, includes at least the following steps: (i) the on-board computer 12 receives train consist parameters (described elsewhere herein) for the train 16 from the computer aided dispatching (CAD) system of the office component 4, (ii) the braking parameters $T_d$ (brake propagation delay time), T (brake build-up time), and $\alpha_m$ (maximum brake rate, also referred to as $\alpha_{max}$) (which are used to determine braking profiles and profile velocities according to a further aspect of the present invention as described in detail elsewhere herein) for the train 16 are calculated by the on-board computer 12 (one particular method of calculating each of these braking parameters is described elsewhere herein), and (iii) the initial location of the train 16 and the direction of travel of the train 16 on the mapped track are determined by the LD function 18 of the on-board computer 12. As used herein, the term "brake propagation delay time" shall mean the time duration between a brake application request (by the on-board computer 12) and the time that the braking effort begins, the term "brake build-up time" shall mean the time duration between braking effort initiation and the achievement of the full braking effort, and the term "maximum brake rate" shall mean the constant brake rate achieved during steady-state braking.

Referring to FIGS. 3A and 3B, the steps of the exemplary embodiment of the braking function methodology of the present invention that are performed as the train 16 moves on the mapped track will now be described. The methodology begins at step 50, wherein the LD function 18 of the on-board computer 12 determines the current location and the current speed (preferably corrected for spin/slide as needed) of the train 16. Next, at step 52, the target data (described elsewhere herein) for all targets in the ATP target table stored in the on-board database 24 that are within a specified distance (three miles in the exemplary embodiment) ahead of the current location of the train 16 are loaded into a local target table maintained by the ATP function 20 (preferably, this data replaces any data that may have previously been loaded into the local target table such that the local target table will, at any time, only have target data for the target(s) that are currently within a specified distance). In addition, the following information is obtained/determined (e.g., calculated) and added the local target table: (i) the previous target's speed limit, and (ii) the average grade between the tail end of the train 16 and the target (the average grade is based on the actual grade of the grade segments between the previous target and the target). This grade information allows the braking function to calculate the average grade from the current position of the train (the rear end of the train in the exemplary embodiment) to a specific target location. As described in greater detail elsewhere herein, the calculated average grade is then used for determining profile velocities ($V_P$) and selecting targets. As used herein, the term "profile velocity" shall mean the maximum train speed from which an instantaneous full service brake request and subsequent application will result in a train speed reduction to the target speed threshold over the actual distance to target.

Thus, in summary, the local target table will contain the following information for each target: (i) the location of the target (from which a current distance to the target may be determined), (ii) the target speed limit ($V_T$) (iii) the distance between the target and the previous target, (iv) the previous target's speed limit, and (v) the average grade between the tail end of the train 16 and the target.

Figure 4:
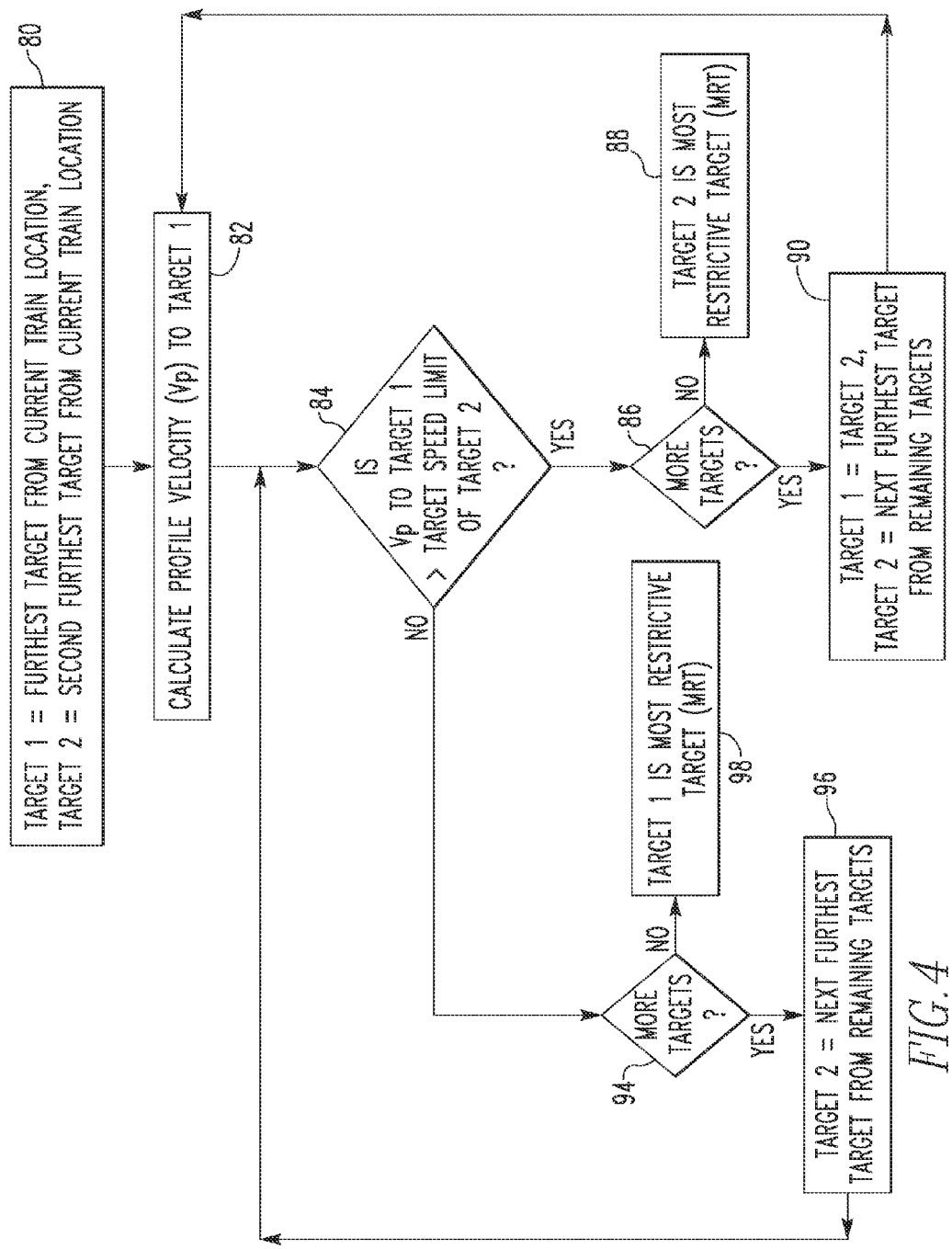
FIG. 4 is a flowchart showing a method for determining the most restrictive target (MRT) from among multiple targets in the local target table maintained and used by the train-borne component of the PTC system of FIG. 1 according to one particular, non-limiting embodiment.

At step 54, a determination is then made as to whether there is more than one target in the local target table. If the answer at step 54 is no, then, at step 56, the only target in the local target table is established as the most restrictive target (MRT). The significance of the MRT is discussed below. If, however, the answer at step 54 is yes, then, at step 58, the MRT is determined from among the multiple targets in the local target table (i.e., one of the targets currently in the local target table is selected as the MRT). One particular method for determining the MRT from among the multiple targets in the local target table is shown in FIG. 4 and described elsewhere herein. As described in greater detail elsewhere herein, the method shown in FIG. 4 includes calculating a profile velocity ($V_P$) to each of the targets in the local target table. In the preferred embodiment, such profile velocities are calculated using the braking profile determination methodology shown in FIGS. 6A and 6B. As described elsewhere herein, that methodology establishes the profile velocity ($V_P$) at each position approaching a target and profiles the train along the curve. Following either step 56 or step 58, the method proceeds to step 60.

At step 60, the profile velocity to MRT ($V_{P-MRT}$) is determined. If step 60 is reached following step 56, that determination will be made by calculating the profile velocity ($V_P$) to the only target in the local target table, preferably using the method of FIGS. 6A and 6B. If step 60 is reached following step 58, the profile velocity to MRT ($V_{P-MRT}$) may be determined from the profile velocities that were previously calculated during the determination of the MRT in step 58. Next, at step 62, the enforceable speed limit (ESL) is determined from the profile velocity to MRT ($V_{P-MRT}$) and the current most restrictive speed (which could be, for example and without limitation, a civil speed limit or a Form A restriction), and in particular is set equal to the lower of the profile velocity to MRT ($V_{P-MRT}$) and the current most restrictive speed. At step 64, time to penalty (TTP) and distance to target ($S_{DTT}$) are calculated and displayed to the crew of the train 16 using one of the locomotive display units 14. Time to penalty (TTP) is, in the exemplary embodiment, calculated as follows:

$$\text{Distance to Penalty} = \frac{(v_P - v_a)\text{Delta } S}{v_P - v_T} \text{ feet}$$

$$\text{Time To Penalty} = \frac{\text{Distance to Penalty}}{1.467\, v_a} \text{ seconds}$$

where $V_a$ is the train's current speed in miles/hour, $V_P$ is the current profile velocity in miles/hour, $V_T$ is the target speed in miles/hour, and Delta S is the train's actual distance to the target from its current position in feet.

Following step 64, the method proceeds to step 66 of FIG. 3B. At step 66, a determination is made as to whether the current speed of the train 16 is less than or equal to the ESL plus some buffer value, discussed in greater detail below. If the answer at step 66 is no, then, at step 68, the ATP function 20 of the on-board computer 12 calls for a penalty brake application (a penalty brake request is issued and sent to the train braking system 26) and brings the train 16 to a stop. If, however, the answer at step 66 is yes, then, at step 70, the train engineer controls the speed of the train 16 and the method returns to step 52 of FIG. 3A. In the exemplary embodiment, the buffer value concept of step 66 works as follows: (i) buffer value is 3 mph (i.e., add 3 mph to the ESL) if the ESL is not 0 mph and is less than or equal to 20 mph; (ii) buffer value is 3 mph (i.e., add 3 mph to the ESL) if the ESL is greater than 20 mph; (iii) buffer value is 3 mph (i.e., add 3 mph to the ESL)

if the ESL is Restricted, but ESL may not exceed 20 mph, and (iv) 0 mph if ESL is 0 mph (i.e., a Stop). In an alternate embodiment, the buffer value may be eliminated from step 66 entirely, in which case a determination is simply made as to whether the current speed of the train 16 is less than or equal to the ESL.

FIG. 4 is a flowchart showing a method for determining the MRT from among multiple targets in the local target table according to one particular, non-limiting embodiment. As noted above, this method may be employed in step 58 of FIG. 3A. In determining the MRT, the method of FIG. 4 considers the targets in the local target table in pairs, starting with the two targets that are furthest from the current position of the train 16. Thus, as described below, the method of FIG. 4 employs the variables "Target 1" and "Target 2" in the steps thereof.

The method begins at step 80, wherein Target 1 is set to the target in the local target table that is furthest from the current position of the train 16, and Target 2 is set to the target in the local target table that is second furthest from the current position of the train 16. Next, at step 82, the profile velocity ($V_P$) to Target 1 is determined. In the exemplary embodiment, the profile velocity ($V_P$) to Target 1 is determined using the braking profile determination methodology shown in FIGS. 6A and 6B and described elsewhere herein. Then, at step 84, a determination is made as to whether the profile velocity ($V_P$) to Target 1 is greater than the speed limit of Target 2. If the answer at step 84 is yes, then, at step 86, a determination is made as to whether there are any more targets (other than those that have been considered) left in the local target table. If the answer at step 86 is no, then, at step 88, Target 2 is determined to be the MRT. If however, the answer at step 86 is yes, meaning there are targets remaining in the local target table that have not yet been considered, then, at step 90, Target 1 is set to Target 2 (in other words, the target that was formerly Target 2 is now Target 1) and Target 2 is set to the one of the remaining targets that is next furthest from the current position of the train 16. The method then returns to step 82 for further processing as described above.

If the answer at step 84 is no, then the method proceeds to 94, wherein a determination is made as to whether there are any more targets (other than those that have been considered) left in the local target table. If the answer at step 94 is no, then, at step 96, Target 1 is determined to be the MRT. If, however, the answer at step 94 is yes, meaning there are targets remaining in the local target table that have not yet been considered, then, at step 98, Target 2 is set to the one of the remaining targets that is next furthest from the current position of the train 16. The method then returns to step 84 for further processing as described above.

As will be appreciated, the method of FIG. 4 will proceed as described until one of the targets in the local target table is selected as the MRT (either step 88 or step 96).

As noted elsewhere herein, an aspect of the present invention relates to a braking profile determination methodology that is able to establish the profile velocity ($V_P$) for a train, such as the train 16, at each position approaching a target and profile the train along the curve. More specifically, one general philosophy of the protection and braking methodology implemented in the on-board computer 12 as described in detail elsewhere herein is for the on-board computer 12 to periodically (e.g., each software cycle) determine the maximum speed that the train 16 can be traveling at its current position (a particular distance away from a particular target over a specific grade scenario) and protect the train 16 against exceeding that speed. This maximum speed is the profile velocity ($V_P$) that has been discussed elsewhere herein. In order to calculate profile velocity ($V_P$) to a particular target position using the braking profile determination methodology of this aspect of the present invention, it is necessary to determine the following parameters: (i) the average grade between the current position of the train 16 and the target position; (ii) the braking parameters $T_d$ (brake propagation delay time), T (brake build-up time), and $\alpha_m$ (maximum brake rate) of the configuration of train 16 (a specific methodology for determining these braking parameters is described elsewhere herein); and (iii) the center of gravity of the configuration of train 16 (the braking calculations described herein are valid only when grade is referenced from the center of gravity).

In addition, in order to fully appreciate the development of the methods associated with determination of profile velocity ($V_P$) and time to penalty (TTP) of this aspect of the invention, some fundamentals associated with train braking must be established. Braking consists of three segments as follows: (1) the free run segment, which occurs during the propagation delay portion (i.e., from the time the brake application is requested by the on-board computer 12 until the time that the actual braking effort begins), (2) the transient segment, which occurs during the brake build-up (i.e., from the time that the actual braking effort begins until the full braking effort is achieved), and (3) the steady state segment, which occurs during the constant braking portion at the full braking effort. As used herein, the term "transient braking" shall mean the increasing deceleration to the maximum brake rate that occurs during the brake build-up time and the term "steady-state braking" shall mean the constant deceleration that occurs at the full braking effort after transient braking is complete. The equations that describe the velocity and distance traveled for each of these braking segments were used in the development of the profile velocity and time to penalty determination methodologies described herein and are defined in FIG. 5. In those equations, $\alpha_m$ (also referred to herein as $\alpha_{max}$) is the maximum brake rate (brake capacity) (mph/s), $g_{avg}$ is the average grade of the track between the train's current position and the target position (% grade), k is the conversion factor needed to determine the effect of gravity on the stopping distance and is equal to 0.219 mph/s per % grade, $S_{DTT}$ is the train's distance to target (feet), $S_P$ is the distance that the train travels during the propagation delay (feet), $S_{SS}$ is the distance that the train travels during constant braking (feet), $S_t$ is the distance that the train travels during the transient brake build-up (feet), T is the brake build-up time (seconds), $T_d$ is the brake propagation delay time (seconds), $V_i$ is the train velocity after the brake propagation delay (mph), $V_P$ is the profile velocity (mph), $V_{SS}$ is the train velocity after the transient brake build-up (mph), and $V_T$ is the target velocity (mph).

Figure 5:
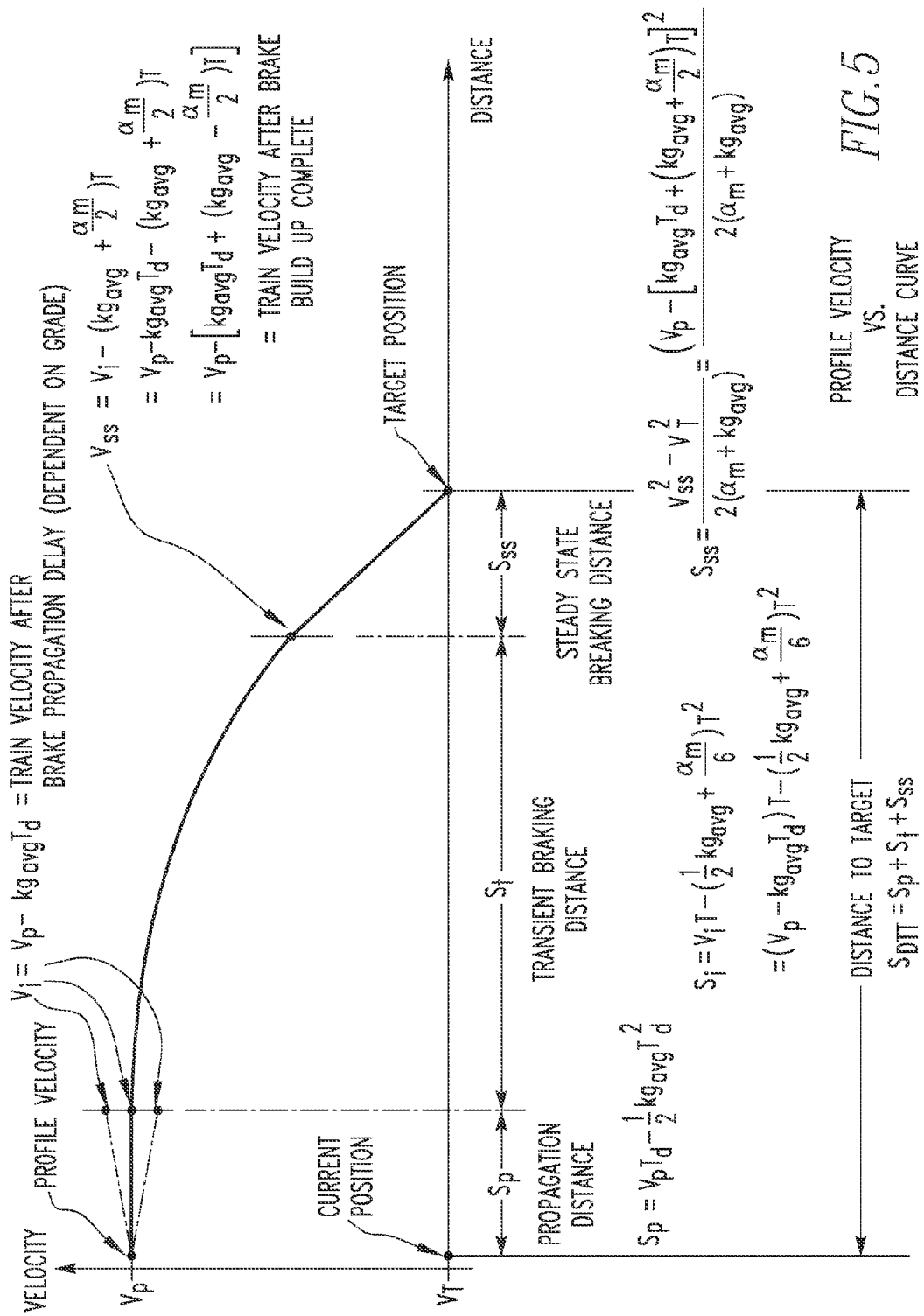
FIG. 5 is a profile velocity v. distance curve that shows the equations that describe the velocity and distance traveled for each of the free run, transient and steady state braking segments that were used in the development of the profile velocity and time to penalty determination methodologies described herein.

In order to solve for the desired profile velocity ($V_P$), each velocity and distance equation is converted to a function of the profile velocity ($V_P$) as presented in FIG. 5. A summary of relevant equations is presented below.

The equation that defines the train's velocity after the brake propagation delay time is complete as a function of the profile velocity ($V_P$) is:

$$v_i = v_p - k g_{avg} T_d \quad (1)$$

The equation that defines the train's velocity after the brake build-up time is complete as a function of the profile velocity ($V_P$) is:

$$v_{SS} = v_i - \left(kg_{avg} + \frac{\alpha_{max}}{2}\right)T \quad (2)$$

$$= v_P - kg_{avg}T_d - \left(kg_{avg} + \frac{\alpha_{max}}{2}\right)T$$

$$= v_P - \left[kg_{avg}T_d + \left(kg_{avg} + \frac{\alpha_{max}}{2}\right)T\right]$$

The equation that defines the distance traveled after the brake propagation delay time is complete as a function of the profile velocity ($V_P$) is:

$$S_P = v_P T_d - \frac{1}{2}kg_{avg}T_d^2 \quad (3)$$

The equation that defines the distance traveled after the brake build-up time is complete as a function of the profile velocity ($V_P$) is:

$$S_T = v_i T - \left(\frac{1}{2}kg_{avg} + \frac{\alpha_{max}}{6}\right)T^2 \quad (4)$$

$$= (v_P - kg_{avg}T_d)T - \left(\frac{1}{2}kg_{avg} + \frac{\alpha_{max}}{6}\right)T^2$$

The equation that defines the distance traveled during steady state braking as a function of the profile velocity ($V_P$) is:

$$S_{SS} = \quad (5)$$

$$\frac{v_{SS}^2 - v_T^2}{2(\alpha_{max} + kg_{avg})} = \frac{\left(v_P - \left[kg_{avg}T_d + \left(kg_{avg} + \frac{\alpha_{max}}{2}\right)T\right]\right)^2 - v_T^2}{2(\alpha_{max} + kg_{avg})}$$

The general equations as a function of time for velocities and distances associated with the brake propagation delay and brake build-up segments are as follows:

$$v_i(t) = v_P - kg_{avg}t \quad 0 \le t \le T_d \quad (1a)$$

$$S_P(t) = v_P t - \frac{1}{2}kg_{avg}t^2 \quad 0 \le t \le T_d \quad (3a)$$

$$v_{SS}(t) = v_i - kg_{avg}t - \frac{\alpha_{max}}{2T}t^2 \quad 0 \le t \le T \quad (2a)$$

$$S_T(t) = v_i t - \frac{1}{2}kg_{avg}t^2 - \frac{\alpha_{max}}{6T}t^3 \quad 0 \le t \le T \quad (4a)$$

With these fundamental braking concepts and velocity/distance equations established, the methodologies associated with determination of the profile velocity and time to penalty will now be described.

Figure 6A:
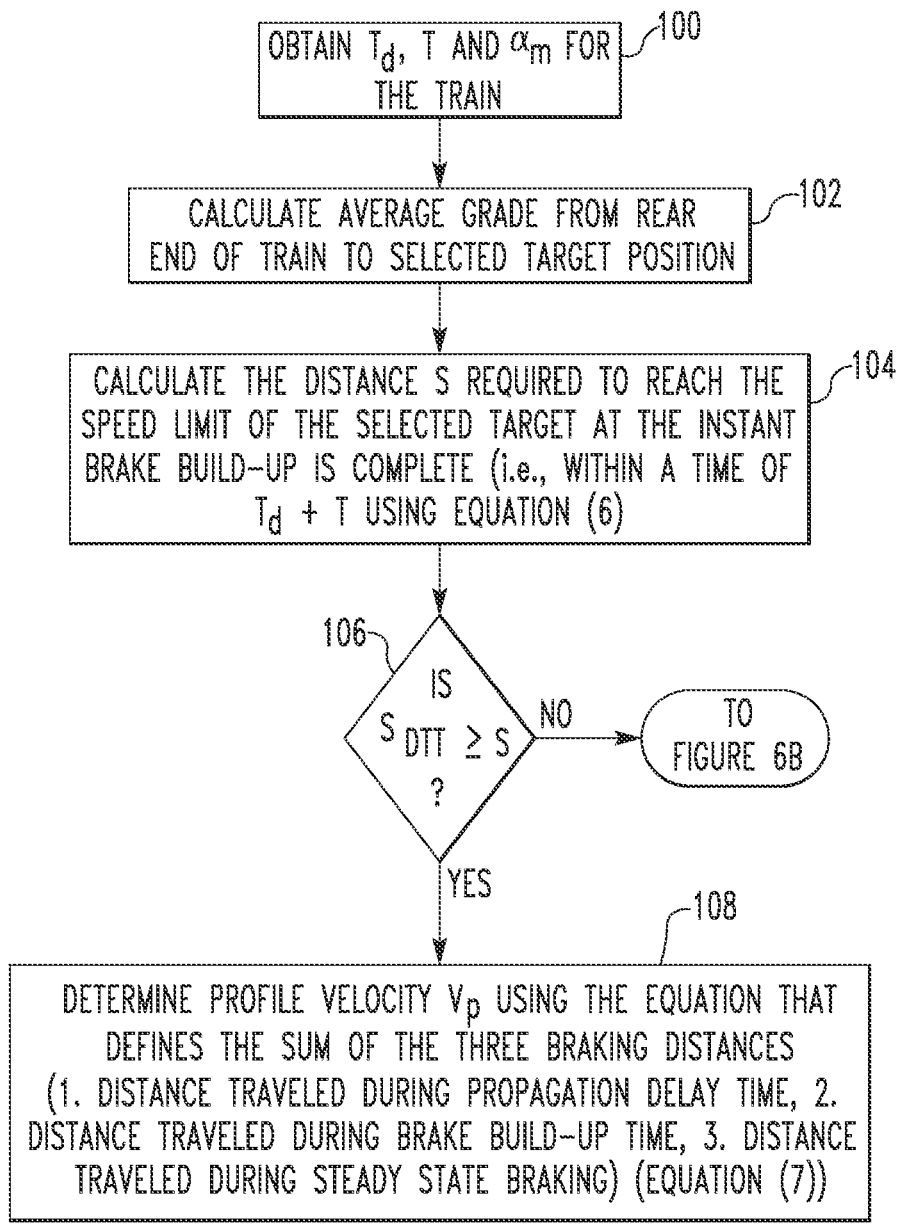
FIGS. 6A and 6B are a flowchart showing one particular embodiment of a profile velocity determination methodology that may be employed by the PTC system of FIG. 1.
Figure 6B:
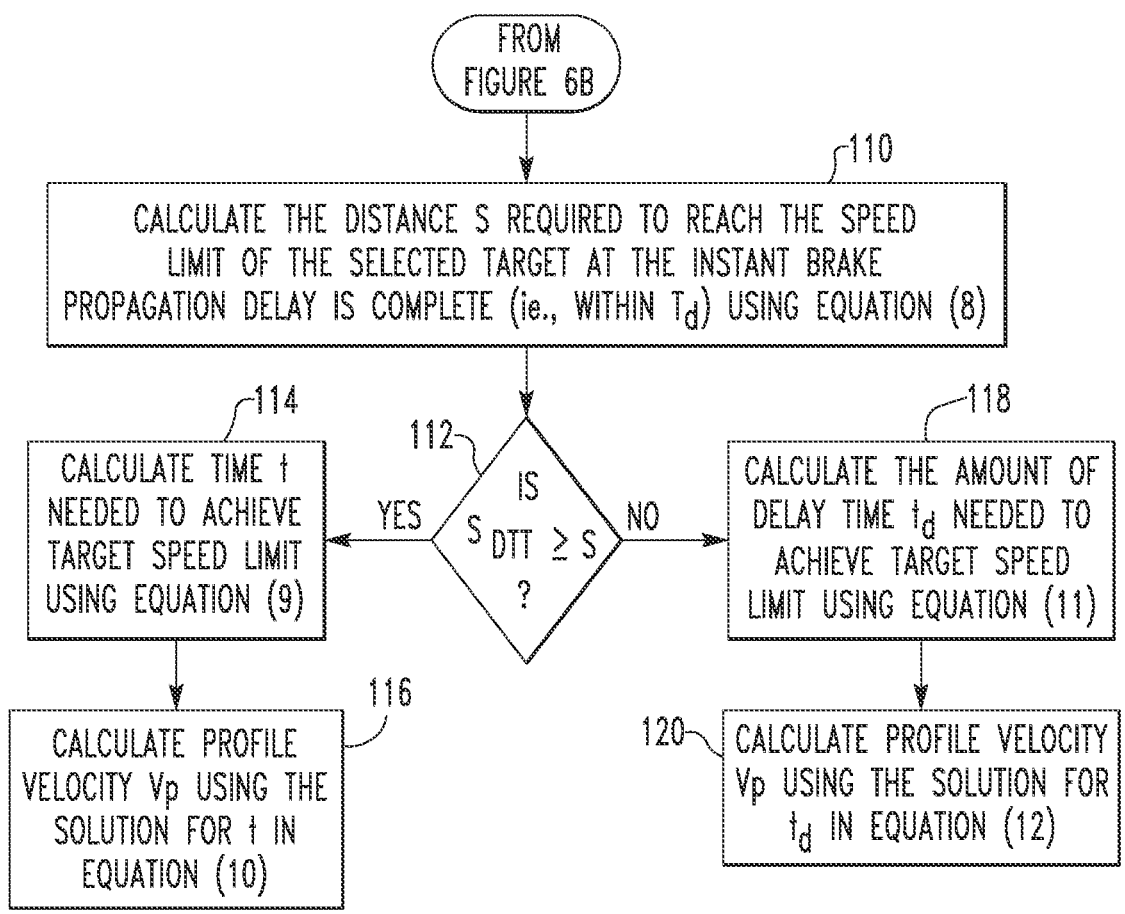

The development of the profile velocity determination methodology begins with the fundamental assertion that, for any position with known distance to target, there exists a velocity for which the braking distance between that velocity and the target velocity is equal to the actual distance to the target. As discussed elsewhere herein, this velocity is referred to as the profile velocity ($V_P$). The initial problem that is encountered when attempting to establish the profile velocity ($V_P$) at any given location (a particular distance away from a particular target over a specific grade scenario) is that one does know which of the available equations to solve given a specific target velocity and distance to target. In other words, the train 16 may be able to reach the target velocity (e.g., the speed limit of the particular target) over the associated distance to the target during the brake propagation time due to grade, or during the brake build-up time, or after the propagation and brake build-up times are complete and steady state braking is in effect. Each of these scenarios presents a different set of equations to solve and there is nothing inherent in the known data to differentiate. Therefore, the profile velocity determination methodology described herein performs a series of tests in order to identify the correct braking scenario and associated equations. This presents an additional problem in that the profile velocity ($V_P$) that needs to be identified is not yet known, and therefore an approach for which it is not required must be utilized. The approach used by the profile velocity determination methodology described herein is to consider the distance necessary to achieve the target velocity from some unknown speed at the exact instant that the brake build-up is complete and compare that distance to the actual distance of the train 16 to the target. The equation that is used evaluates this distance from the target position backwards, since the initial velocity is not known. FIGS. 6A and 6B are a flowchart showing one particular embodiment of the profile velocity determination methodology. The steps shown in FIGS. 6A and 6B are described in detail below.

The method begins at step 100, wherein the braking parameters $T_d$ (brake propagation delay time), T (brake build-up time), and $\alpha_m$ (maximum brake rate) of the train 16 are obtained. In the exemplary embodiment, these braking parameters are calculated by the ATP function 20 of the on-board computer 12. In addition, one specific methodology for determining these braking parameters is described elsewhere herein. Next, at step 102, the average grade form the rear end of the train 16 to the selected target position is calculated. In the exemplary embodiment, this average is calculated by the ATP function 20 of the on-board computer 12 based on the target data received from the ATP target table.

As noted above, the approach used by the profile velocity determination methodology described herein is to consider the distance necessary to achieve the target velocity from some unknown speed at the exact instant that the brake build-up is complete and compare that distance to the actual distance of the train 16 to the target. Thus, at step 104, the ATP function 20 of the on-board computer 12 calculates the distance S that would be required to reach the speed limit of the selected target at the instant brake build-up is complete (i.e., within the time of $T_d$+T). In the exemplary embodiment, the fundamental distance equation developed and used by the on-board computer 12 for the distance S traveled after the brake build-up is complete is as follows (also see FIG. 5):

$$S = S_P + S_T \quad (6)$$

$$= \left(v_P T_d - \frac{1}{2}kg_{avg}T_d^2\right) + \left[v_i T - \left(\frac{1}{2}kg_{avg} + \frac{\alpha_{max}}{6}\right)T^2\right]$$

then, for $$v_i = v_T + \left(kg_{avg} + \frac{\alpha_{max}}{2}\right)T$$

and $$v_P = v_i + kg_{avg}T_d = v_T + \left(kg_{avg} + \frac{\alpha_{max}}{2}\right)T + kg_{avg}T_d$$

-continued
$$S = [v_T + (kg_{avg} + \frac{\alpha_{max}}{2})T + kg_{avg}T_d]T_d -$$
$$\frac{1}{2}kg_{avg}T_d^2 + [v_T + (kg_{avg} + \frac{\alpha_{max}}{2})T]T - (\frac{1}{2}kg_{avg} + \frac{\alpha_{max}}{6})T^2$$

If the solution S to equation (6) is less than the actual distance to the target $S_{DTT}$, braking will progress through the brake propagation and build-up segments and steady state braking is necessary to achieve the target speed. Thus, at step 106, a determination is made as to whether $S_{DTT}$ is greater than or equal to S. If the answer is yes, than, as noted above, steady state braking is necessary to achieve the target speed and the method proceeds to step 108. At step 108, the ATP function 20 of the on-board computer 12 determines the profile velocity ($V_P$) to the selected target using an equation that defines the sum of the three braking distances, i.e., the distance traveled during brake propagation delay time, the distance traveled during brake build-up time (transient braking), and the distance traveled during steady state braking. In the exemplary embodiment, that equation is as follows:

$$S = S_P + S_T + S_{SS}$$
$$= \{v_P - \frac{1}{2}kg_{avg}T_d^2\} + \{(v_P - kg_{avg}T_d)T - (\frac{1}{2}kg_{avg} + \frac{\alpha_{max}}{6})T^2\} +$$
$$\left\{\frac{(v_P - [kg_{avg}T_d + (kg_{avg} + \frac{\alpha_{max}}{2})T])^2 - v_T^2}{2(\alpha_{max} + kg_{avg})}\right\}$$

and reduces to the quadratic equation in $v_P$ as follows:

$$v_P^2 + (\alpha_{max}T_d + \alpha_{max}T)v_P - \left[\alpha_{max}\left(\frac{\alpha_{max} + 4kg_{avg}}{12}\right)T^2 + \right. \tag{7}$$
$$\left. kg_{avg}\alpha_{max}T_d(T + T_d) + v_T^2 + 2(\alpha_{max} + kg_{avg})S_{DTT}\right] = 0$$

Solving this quadratic equation (7) results in the profile velocity ($V_P$).

If the solution S to equation (6) is not less than the actual distance to the target, i.e., if the answer at step 106 is no, then steady state braking is not necessary for the train 16 to achieve the target speed from the unknown profile velocity. It must then determined if transient braking would be necessary to achieve the target speed. To accomplish this, the distance necessary for the train 16 to achieve the target velocity from some unknown speed at the exact instant that the brake propagation delay time is complete is evaluated and this distance is compared to the actual distance of the train 16 to the target. Thus, at step 110, the ATP function 20 of the on-board computer 12 calculates the distance S required to reach the speed limit of the selected target at the instant brake propagation delay is complete (i.e., within $T_d$). In the exemplary embodiment, the fundamental distance equation developed and used by the on-board computer 12 for the distance S traveled after the brake build-up is complete as follows (also see FIG. 5):

$$S = S_P \tag{8}$$
$$= v_PT_d - \frac{1}{2}kg_{avg}T_d^2$$

then, for
$$v_P = v_T + kg_{avg}T_d$$
$$S = v_TT_d + \frac{1}{2}kg_{avg}T_d^2$$

If the solution S to equation (8) is less than the actual distance to the target $S_{DTT}$, braking will progress through the brake propagation segment and transient braking is necessary for the train 16 to achieve the target speed from the unknown profile velocity. Thus, at step 112, a determination is made as to whether $S_{DTT}$ is greater than or equal to S calculated in step 110. If the answer is yes, then, as noted above, transient braking is necessary to achieve the target speed. In other words, braking has to progress through $T_d$ and target speed will be achieved at some time t during the brake build-up interval T. At this stage, it is necessary to determine how much of the brake build-up time will be expired when the train 16 reaches the target velocity. In other words, the train 16 may reach the target velocity over the particular distance to target at some time during the brake build-up and not require the full brake build-up time. Therefore, it is necessary to solve for the amount of brake build-up time t required for the train 16 to reach the target velocity before the method can proceed with the solution of the profile velocity ($V_P$). Thus, following a yes answer at step 112, the method proceeds to step 114, wherein the amount of brake build-up time t required for the train 16 to reach the target velocity is calculated. In the exemplary embodiment, the on-board computer 12 bases that calculation on the following:

$$S = S_P + S_T$$
$$= v_PT_d - \frac{1}{2}kg_{avg}T_d^2 + [v_iT - (\frac{1}{2}kg_{avg} + \frac{\alpha_{max}}{6})T^2];$$

however, for partial brake build-up time t, $S = S_P + S_t$ $$S = S_P + S_t = \left(v_PT_d - \frac{1}{2}kg_{avg}T_d^2\right) + \left(v_it - \frac{1}{2}kg_{avg}t^2 - \frac{\alpha_{max}}{6T}t^3\right)$$

and for
$$v_i = v_T + kg_{avg}t + \frac{\alpha_{max}}{2T}t^2$$

and
$$v_p = v_i + kg_{avg}T_d = \left(v_T + kg_{avg}t + \frac{\alpha_{max}}{2T}t^2\right) + kg_{avg}T_d$$
$$S = S_p + S_t = \left[\left(v_T + kg_{avg}t + \frac{\alpha_{max}}{2T}t^2 + kg_{avg}T_d\right)T_d - \frac{1}{2}kg_{avg}T_d^2\right] +$$
$$\left[\left(v_T + kg_{avg}t + \frac{\alpha_{max}}{2T}t^2\right)t - \frac{1}{2}kg_{avg}t^2 - \frac{\alpha_{max}}{6T}t^3\right];$$

setting S=the actual distance to target $S_{DTT}$, the equation reduces to the cubic equation in t as follows:

$$\left(\frac{\alpha_{max}}{6T} - \frac{\alpha_{max}}{2T}\right)t^3 - \left(\frac{\alpha_{max}}{2T}T_d + \frac{1}{2}kg_{avg}\right)t^2 - \tag{9}$$

-continued $$(v_T + kg_{avg}T_d)t + \left[S_{DDT} - \left(v_T T_d + \frac{1}{2}kg_{avg}T_d^2\right)\right] = 0$$

The brake build-up time t is then solved for recursively. Next, at step 116, the solution for t is used to calculate the profile velocity ($V_P$) based on the following:

$$v_T = v_i - kg_{avg}t - \frac{\alpha_{max}}{2T}t^2 \quad (1)$$

for $$v_i = v_P - kg_{avg}T_d$$

$$v_T = (v_P - kg_{avg}T_d) - kg_{avg}t - \frac{\alpha_{max}}{2T}t^2$$

$$\therefore$$

$$v_P = v_T + kg_{avg}T_d + kg_{avg}t + \frac{\alpha_{max}}{2T}t^2$$

If the solution S to equation (8) is not less than the actual distance to the target $S_{DTT}$ (i.e., if the answer at step 112 is no), then that means that transient braking is not necessary for the train 16 to achieve the target speed from the unknown profile velocity (i.e., the target speed will be achieved within the propagation delay time). In such a circumstance, it is necessary to determine how much (i.e., what fraction or portion) of the propagation delay time ($T_d$) is required for the train 16 to achieve the target speed. In other words, the train 16 may reach the target speed over the particular distance to target at some time during the propagation delay and not require the full propagation delay time ($T_d$). Therefore, the amount of propagation delay time required for the train 16 to achieve the target speed (referred to herein as $t_d$) must be solved for before the method can proceed with the solution of the profile velocity ($V_P$). Thus, at step 118, the on-board computer 12 calculates that delay time $t_d$. In the exemplary embodiment, the on-board computer 12 bases that calculation on the following:

$$S = S_P$$

$$= v_P T_d - \frac{1}{2}kg_{avg}T_d^2;$$

however, for partial propagation delay time $t_d$, $S=S_P$;

$$S = S_p = v_P t_d - \frac{1}{2}kg_{avg}t_d^2$$

for $$v_P = v_T + kg_{avg}t_d$$

$$S = S_p = (v_T + kg_{avg}t_d)t_d - \frac{1}{2}kg_{avg}t_d^2$$

setting S=the actual distance to target $S_{DTT}$, the equation reduces to the quadratic equation in $t_d$ as follows:

$$\left(\frac{1}{2}kg_{avg}\right)t_d^2 + (v_T)t_d - S_{DTT} = 0 \quad (11)$$

The partial delay time $t_d$ is then solved for recursively. Next, at step 120, the solution for $t_d$ is used to calculate the profile velocity $V_P$ based on the following:

$$v_P = v_T + kg_{avg}t_d \quad (12)$$

In short, the methodology shown in FIGS. 6A and 6B may be summarized as follows. First, evaluate the distance required to achieve the target speed at the instant that transient braking is complete by solving equation (6) for S. If the distance to target is greater than or equal to the calculated distance S (braking will progress through the full brake build-up and steady state braking will be necessary to achieve the target velocity during the braking process), then solve quadratic equation (7) for $V_P$. If the distance to target is not greater than or equal to the calculated distance S, then evaluate the distance required to achieve the target speed at the instant that the brake propagation delay is complete by solving equation (8) for S. If the distance to target is greater than or equal to the calculated distance S (braking will progress through the brake propagation delay and the target velocity will be achieved during transient braking), then solve cubic equation (9) for t and solve equation (10) for $V_P$ using the solution t. If the distance to target is not greater than or equal to the calculated distance S (the target velocity will be achieved during the brake propagation delay), then solve quadratic equation (11) for $t_d$ and solve equation (12) for $V_P$ using the solution $t_d$.

In one particular embodiment, the braking parameters $T_d$ (brake propagation delay time), T (brake build-up time), and $\alpha_{max}$ (maximum brake rate, also referred to as $\alpha_m$) for a given type of train consist are computed in the on-board computer 12 using the following general expressions, called braking parameter expressions:

$$T_d = a_0 + (a_1 \times L) + \sum_{i=1}^{N} b_i \times n_i$$

$$T = c_0 + (c_1 \times L) + \sum_{i=1}^{N} d_i \times n_i$$

$$\alpha_{max} = e_0 + (e_1 \times w^{-e_2}) + (e_3 \times L) + \sum_{i=1}^{N} f_i \times n_i$$

As noted elsewhere herein, these braking parameters are used to determine braking profiles and profile velocities according to a further aspect of the present invention (See FIGS. 6A and 6B).

In the above braking parameter expressions, $a_0$, $a_1$, $b_i$, $c_0$, $c_1$, $d_i$, $e_0$, $e_1$, $e_2$, $e_3$, and $f_i$ are all constants for a given train consist type. In addition, in the above braking parameter expressions, L is the length of the train consist, $$w = \frac{W}{V},$$

where W is the total weight of the train consist and V is the total number of brake valves in the train consist, excluding those on the locomotives in the train consist, N is the total number of cars in the train consist, excluding the locomotives, and $n_i$ is the number of each type of car in the train consist, excluding the locomotives. The parameters L, W, V, N, and $n_i$ are, for a given train consist type, referred to herein as consist parameters, and the constants $a_0$, $a_1$, $c_0$, $c_1$, $d_i$, $e_0$, $e_1$, $e_2$, $e_3$, and $f_i$ are, for a given train consist type, referred to herein as braking parameter expression coefficients.

Train consists typically used on a railroad can be classified into the following main types: (i) freight train consists made up with different freight cars such as hoppers, flat cars, tank cars, box cars, gondolas, air dump cars, etc., (ii) passenger train consists made up with different types of passenger cars, and (iii) mixed train consists for trains with a mix of passenger and freight cars. In addition, the major freight train consist types can be further divided into sub-types such as unit hopper trains, unit tank car trains, unit flat car trains, and mixed freight trains.

Typically, the characteristics of each passenger and freight car in a railroad's fleet are known. These characteristics include, without limitation, empty and maximum loaded weight, empty/load sensors, length, number and type of brake valves, brake cylinder piston stroke length, brake pipe length and pressure, and braking force per shoe. When a railroad configures a specific train consist type for a specific journey, the consist parameters $\{L, W, V, N, \text{and } n_i\}$ will be known. Then, if the braking parameter expression coefficients $\{a_0, a_1, b_i, c_0, c_1, d_i, e_0, e_1, e_2, e_3, \text{and } f_i\}$ are known, the braking parameters $\{T_d, T, \text{and } \alpha_{max}\}$ for a given train consist type can be computed by the on-board computer 12 using the braking parameter expressions identified above.

In the exemplary embodiment, the braking parameter expression coefficients $\{a_0, a_1, b_i, c_0, c_1, d_i, e_0, e_1, e_2, e_3, \text{and } f_i\}$ for a given train consist type for train 16 are determined using the following procedure. First, speed vs. distance and deceleration vs. time plots, with braking applied to bring the train 16 to a stop from a known initial speed over a known territory of constant grade, are obtained either from field runs or from simulations of a large sample of train consist configurations of a given type. Next, the deceleration vs. time plot in each run or simulation is approximated into three segments represented by the three braking parameters $\{T_d, T, \text{and } \alpha_{max}\}$. That is, sample data points of $\{T_d, T, \text{and } \alpha_{max}\}$ are obtained as functions of consist parameters $\{L, W, V, N, \text{and } n_i\}$. Then, using a non-linear regression curve-fitting process that minimizes the sum of the squares of the residual error, the braking parameter expressions are obtained for the Liven train consist type. The obtained braking parameter expressions are then stored in the on-board computer 12 for each train consist type (freight, passenger and mixed), to be used to calculate the braking parameters $\{T_d, T, \text{and } \alpha_{max}\}$ for the given train consist type at the beginning its journey and at any intermediate point when the particulars of the consist change due to car set-outs and pick-ups.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of selecting a most restrictive target from among a plurality of targets for a train having an on-board computer, the train being located at a current position, the method comprising performing each of the following steps in the on-board computer:
   (a) initially including all of plurality of targets in a group of targets to be evaluated; and
   (b) performing a series of evaluations on selected pairs of the targets in the group until only one of the targets remains in the group, wherein in each of the evaluations a first one of the targets remaining in the group and a second one of the targets remaining in the group are evaluated together to determine which one of them is a more restrictive target based on a profile velocity to the first one of the targets and a speed limit associated with the second one of the targets, wherein in each of the evaluations the first one of the targets is the target remaining in the group that is furthest from the current position of the train and the second one of the targets is the target remaining in the group that is second furthest from the current position of the train, and wherein following each of the evaluations the one of the first one of the targets and the second one of the targets not determined to be more restrictive is removed from the group, and wherein when all of the evaluations are completed the one of the targets that remains in the group is identified as the most restrictive target.

2. The method according to claim 1, wherein each of the evaluations is also based on a time to penalty brake application for the second one of the targets.

3. The method according to claim 2, wherein in each of the evaluations, the first one of the targets is determined to be more restrictive if the profile velocity to the first one of the targets is not greater than the speed limit associated with the second one of the targets and if the time to penalty brake application for the second one of the targets is not less than a predetermined time, and wherein the second one of the targets is determined to be more restrictive if the profile velocity to the first one of the targets is greater than the speed limit associated with the second one of the targets or if the time to penalty brake application for the second one of the targets is less than the predetermined time.

4. A train-borne component of a positive train control system comprising an on-board computer for a train, the on-board computer being programmed to select a most restrictive target from among a plurality of targets when the train is located at a current position by:
   (a) initially including all of the plurality of targets in a group of targets to be evaluated; and
   (b) performing a series of evaluations on selected pairs of the targets in the group until only one of the targets remains in the group, wherein in each of the evaluations a first one of the targets remaining in the group and a second one of the targets remaining in the group are evaluated together to determine which one of them is a more restrictive target based on a profile velocity to the first one of the targets and a speed limit associated with the second one of the targets, wherein in each of the evaluations the first one of the targets is the target remaining in the group that is furthest from the current position of the train and the second one of the targets is the target remaining in the group that is second furthest from the current position of the train, and wherein Mowing each of the evaluations the one of the first one of the targets and the second one of the targets not determined to be more restrictive is removed from the group, and wherein when all of the evaluations are completed the one of the targets that remains in the group is identified as the most restrictive target.

5. The train-borne component according to claim 4, wherein each of the evaluations is also based on a time to penalty brake application for the second one of the targets.

6. The train-borne component according to claim 5, wherein in each of the evaluations, the first one of the targets is determined to be more restrictive if the profile velocity to the first one of the targets is not greater than the speed limit associated with the second one of the targets and if the time to penalty brake application for the second one of the targets is not less than a predetermined time, and wherein the second one of the targets is determined to be more restrictive if the profile velocity to the first one of the targets is greater than the speed limit associated with the second one of the targets or if the time to penalty brake application for the second one of the targets is less than the predetermined time.

* * * * *

UNITED STATES PATENT AND TRADEMARK OFFICE
CERTIFICATE OF CORRECTION

PATENT NO. : 9,090,272 B2
APPLICATION NO. : 14/177588
DATED : July 28, 2015
INVENTOR(S) : William Stover Rhea et al.

It is certified that error appears in the above-identified patent and that said Letters Patent is hereby corrected as shown below:

Title page
Item (57), ABSTRACT, line 7, "methods" should read --method--.

Specification
Column 7, line 46, "the" should read --to the--.
Column 12, line 35, "form" should read --from--.
Column 13, lines 35 through 40, equation (7), " $$v_P^2 + (\alpha_{max}T_d + \alpha_{max}T)v_P - \left[\alpha_{max}\left(\frac{\alpha_{max} + 4kg_{avg}}{12}\right)T^2 + kg_{avg}\alpha_{max}T_d(T+T_d) + v_T^2 + 2(\alpha_{max} + kg_{avg})S_{DIT}\right] = 0$$ "

should read

-- $$v_P^2 + (2\alpha_{max}T_d + \alpha_{max}T)v_P - \left[\alpha_{max}\left(\frac{\alpha_{max} + 4kg_{avg}}{12}\right)T^2 + kg_{avg}\alpha_{max}T_d(T+T_d) + v_T^2 + 2(\alpha_{max} + kg_{avg})S_{DIT}\right] = 0$$ --.

Column 13, line 49, "then determined" should read --then be determined--.
Column 15, line 10, "(1)" should read --(10)--.
Column 17, line 27, "Liven" should read --given--.

Claims
Column 18, lines 50 and 51, claim 4, "Mow-ing" should read --following--.

Signed and Sealed this
Sixteenth Day of February, 2016

Michelle K. Lee
*Director of the United States Patent and Trademark Office*